United States Patent [19]
Franco et al.

[11] 3,942,137
[45] Mar. 2, 1976

[54] DEVICE FOR THE REMOTE ADJUSTMENT OF AN INACCESSIBLE ELEMENT

[75] Inventors: Pierre Franco, Paris; Henri Brzozowski, Colombes, both of France

[73] Assignee: Compagnie Industrielle des Telecommunications Cit-Alcatel, Paris, France

[22] Filed: Nov. 19, 1974

[21] Appl. No.: 525,116

[30] Foreign Application Priority Data
Nov. 28, 1973 France .............................. 73.42358

[52] U.S. Cl. ...... 333/16; 179/170 A; 179/175.31 R; 333/18
[51] Int. Cl.² .......................................... H03H 7/16
[58] Field of Search ..................... 333/16, 17 R, 18; 178/63 E, 69 R, 69 A, 69 G, 69 M, 69 N; 179/15 BP, 170 A, 175.31 R

[56] References Cited
UNITED STATES PATENTS

| | | | |
|---|---|---|---|
| 1,743,141 | 1/1930 | Ilgenfritz | 333/16 |
| 2,037,107 | 4/1936 | Abraham | 333/16 |
| 2,843,668 | 7/1958 | Ilgenfritz | 178/69 R |
| 3,804,995 | 4/1974 | Becker | 333/16 X |

*Primary Examiner*—Paul L. Gensler
*Attorney, Agent, or Firm*—Waters, Schwartz & Nissen

[57] ABSTRACT

The invention relates to a device for the remote adjustment of a switchable network equipping an unattended station on a transmission line, by means of remote control frequencies emitted from a terminal station on this line. The device enables the remote control of a motor actuating a switch which operates said switchable network. The moving of the switch, and then the adjusting of the network, can be followed at the terminal station from the observing of the level of a return frequency sent back from the unattended station to the terminal station.

11 Claims, 6 Drawing Figures

DEVICE FOR THE REMOTE ADJUSTMENT OF AN INACCESSIBLE ELEMENT

The invention relates to a device enabling the remote adjustment of an inaccessible element situated on a transmission line. It concerns more particularly the adjustment of an inaccessible equalizer, for example an equalizer equipping a multiplex telephone connection by submarine cable, from a terminal station on land.

It is known that, on a frequency multiplex telephone connection cable having a great length, comprising numerous repeaters, the correction of the equivalent-frequency curve effected at the level of each repeater is imperfect; this requires the insertion of an equalizer, at intervals of $k$ repeaters (for example $k = 8$), to overcome the imperfections accumulated by $k$ repeaters.

Such an equalizer comprises, in principle, two parts:

a. A fixed part, adjusted at the factory, according to the measurements made at the factory on the repeaters;

b. A part which is adjustable in situ, comprising a switchable network, intended for compensating residual deviations due to:

The temperature effect occurring at the rhythm of seasonal variations in the temperature of the sea, especially at slight depths;

The pressure effect (dispersions on the pressure coefficient of the cable);

The effect known as the "lay effect";

The aging of the connection.

In the most current cases, the transmission is of the 2-wire N + N type, with a low-frequency band for one transmitting direction and a high-frequency band for transmitting in the opposite direction. The complete equalizer then comprises a first fixed "high-frequency" corrector, a second fixed "low-frequency" corrector, both adjusted at the factory, and a switchable network, remote controlled from a terminal station, covering the whole of the transmitted band.

Nevertheless, the invention has a general scope and may be applied to any correction element or other element with a view to the remote adjusting thereof by a switch having one or several sets of contacts.

The nature of the correction to be effected (direction and amplitude) may, to great advantage, be determined according to the method described in British patent application No. 9795/68 and U.S. Pat. No. 3,557,323.

The switchable network is equipped with a first switch having $p$ contact elements (for example $p = 16$).

Before beginning the correcting operation on the equalizer whose order is $i$, the operator knows the position $pO$ of the corresponding switch, which has been observed previously. The correction consists in making the switch of the equalizer whose order is $i$ rotate through a certain number of contact elements in the required direction, the rotation of the switch being remote-controlled.

For that purpose, the invention provides a means for making the first switch of the equalizer whose order is $i$ rotate in a required direction by the sending, on the line, from the terminal station, of remote control frequencies, in functional connection with the emitting of a return frequency Fri towards the terminal station, emitted by an oscillator located in the box of the equalizer concerned, which has a first level assigned to it when the first switch is on a contact element and a second level assigned to it when the first switch is between two contact elements. Said switch is operated by a direct current motor which, for reliability reasons, is fed from said amplified and rectified remote control frequencies, for rotating in one direction or in the other.

The device for the remote adjusting according to the invention, comprises a first access for a first remote control frequency and a second access for a second remote control frequency wherein the two accesses are connected to filters and to rectifier circuits, whose outputs are used for controlling the operation of said motor, the device further comprising means for sending back to the terminal station a return frequency, said return frequency crossing an attenuator comprising an electronic control means controlled by the level of said first or second frequency respectively received in said device.

In a particular embodiment of the invention, the first access is connected to a first terminal of said motor through a first rectifier and filtering circuit, and the second access is connected to a second terminal of said motor through a second rectifier and filtering circuit, said terminals being connected to two respective transistors, interconnected so as to form a flip-flop such that in the case of the presence of the first frequency on the first access, the transistor connected to the second terminal receives at its base a saturation voltage and the transistor connected to the first terminal receives at its base a virtually zero voltage and vice versa.

In another advantageous embodiment of the invention, the first access feeds a transformer having two secondary coils, one of which is connected between the zero potential and a first rectifier and filtering circuit, the latter circuit being connected to one of the terminals of the motor, and whose other coil is connected through a second rectifier and filtering circuit to the other terminal of the motor, and the second access is connected through a third rectifier and filtering circuit to an input for controlling the state of a flip-flop which, as a function of the presence or absence of the second frequency on the second access, connects the motor in parallel with said first or said second rectifier and filtering circuit.

In that embodiment, the two frequencies do not, therefore, control, as in the preceding case, the two rotating directions of the motor, but one of the frequencies which should be characteristic of an equalizer of the line supplies the rotation power for both directions of the motor, whereas the other frequency, which may be the same for all the equalizers of the line, defines the rotating direction.

The return signalling frequency, Fri, crosses an attenuator, which assumes two attenuation values, corresponding to the first switch respectively on a contact element and between contact elements, under the control of a second switch, fast with said first switch. The operator at the terminal station, observing the frequency level Fri received, may thus easily count the number of contact elements crossed, in the required direction, and position the first switch on the appropriate contact element.

Moreover, effective precautions have been taken, inasmuch as concerns the first embodiment, to prevent any confusion between the two remote control frequencies for the rotation of the first switch, F1$i$ for rotation in a first direction, F2$i$ for rotation in the opposite direction. Indeed, the two frequencies assigned to the same equalizer have close values, the difference between those two values being, for example, of the order of 800 c/s, for absolute frequency values of the order of 11 Mc/s. To obtain a sufficient selectivity, the device according to the invention is provided with two very narrow band filters, preferably quartz filters. As these filters can age during the service life of the cable, it is necessary to prevent one of the two frequencies from being able to be transmitted by the filter assigned to the other frequency. For that purpose, the invention provides a means for finely adjusting the frequencies F1$i$ and F2$i$ emitted from the terminal station, on the "instantaneous" resonance of the quartz filters, consisting in adjusting the level of the return frequency, Fri, according to the intensity of the remote control frequency received by the equipment. The adjusting means comprises preferably a semiconductor type attenuator, whose attenuation level varies as a function of the level of the remote control frequency received by the device. The operator at the terminal station, operating a variable frequency oscillator, can thus adjust with great precision the emitted remote control frequencies.

The invention will be described in detail with reference to the accompanying figures, in which.

In the figures, as only the equalizer whose order is $i$ is concerned, the index $i$ has been deleted, in order to simplify the referencing.

Figure 1:
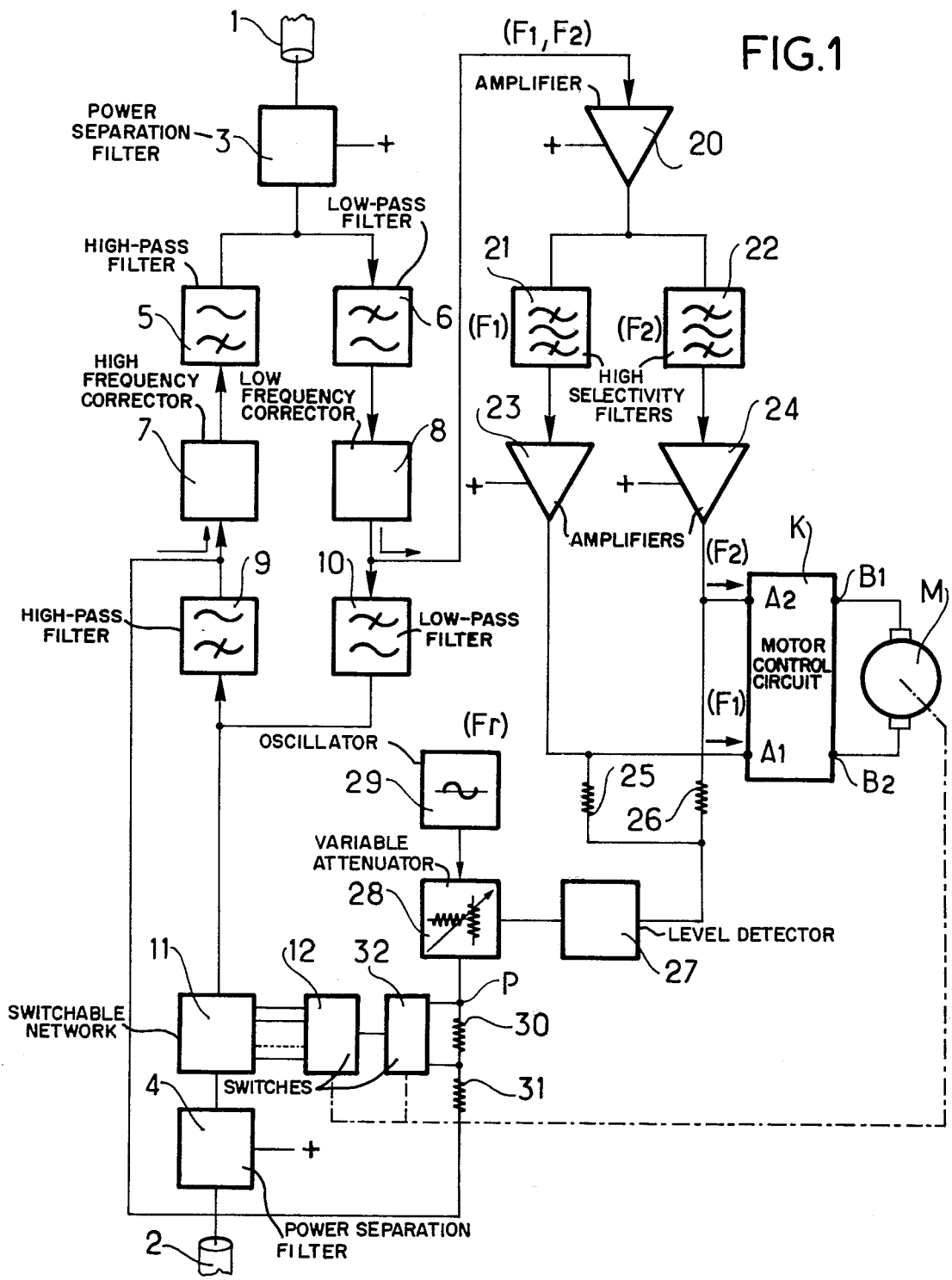
FIG. 1 is a general block diagram of the equipment fitted, for example, to an equalizer.

In FIG. 1, the equalizer equipment is inserted between two sections 1 and 2 of a cable. It is assumed that the terminal station from which the adjustments are controlled is on side 1.

The direct current feeding the repeaters and equalizer units, and particularly equalizer $i$, is extracted from the cable by an element 3 and reinjected in the cable by an element 4. The presence of said direct current is symbolically shown by a + sign. The elements 3 and 4 are conventional power separation filters.

The equalizer comprises a high frequency branch for a first transmitting direction (from 2 towards 1) with a high frequency corrector 7 between two high-pass filters 5 and 9. It comprises also a low frequency branch for the opposite transmitting direction (from 1 towards 2) with a low frequency corrector 8 between two low-pass filters 6 and 10.

The equalizer further comprises a switchable network 11, covering the whole of the band transmitted by the cable, having $p$ switching contact elements (for example $p = 16$). controlled by a first switch 12.

A remote control frequency, F1 or F2, emitted from the terminal station, is extracted at the output of corrector 8 and is applied to a first amplifier 20. The output of amplifier 20 is connected to two band-pass filters in parallel, 21 for frequency F1, 22 for frequency F2.

High-selectivity filters 21 and 22 are preferably quartz filters. They are each followed by an amplifier, 23 and 24, respectively.

The outputs of amplifiers 23 and 24 are connected to inputs A1 and A2 of a circuit K whose outputs B1, B2 are connected to the terminals of a motor M, which is used for operating switch 12 in one direction or the other, according to whether frequency F1 or frequency F2 is sent from the terminal station.

An oscillator 29 permanently sends out frequency Fr towards the controlling terminal station (on side 1), through corrector 7 and high-pass filter 5, a variable attenuator 28, in series at the point P with two resistors 30, 31, being connected at the output of said oscillator. Semi-conductor type variable attenuator 28 is controlled by a direct current which is supplied by a rectifier 27, which receives either frequency F1 through a resistor 25 connected to the output of amplifier 23, or frequency F2 through a resistor 26 connected to the output of amplifier 24.

Resistor 30 is short-circuited when switch 12 is on a contact element, or not short-circuited when switch 12 is between two contact elements. This operation is ensured by a second switch 32, mechanically linked to switch 12. The structure of switch 32 functionally connected with switch 12 has not been described in detail, as its construction is obvious to one skilled in the art.

The operation of the device according to FIG. 1 will be set forth after the description of the figures.

Figure 2:
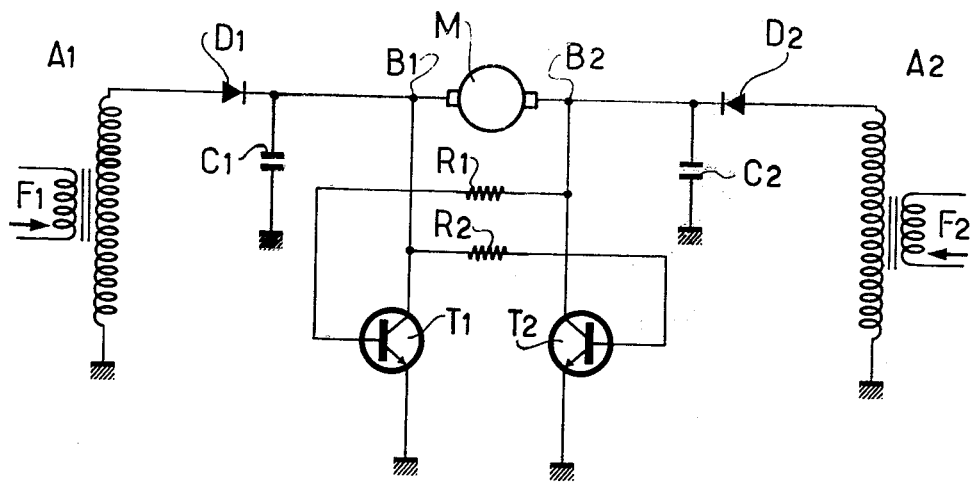
FIG. 2 is a first diagram of a circuit for assigning one of the remote control frequencies to a first direction of rotation of the motor operating the switches and the other to the opposite direction.

FIG. 2 — The circuit K according to FIG. 1 comprises an access A1 having a transformer transmitting frequency F1, an access A2 having a transformer transmitting frequency F2. It comprises, furthermore, two transistors T1, T2, whose collectors are connected to terminals B1, B2 of a motor M; the emitters of the two transistors are connected to the ground; a resistor R1 connects the collector of T2 to the base of T1; a resistor R2 connects the collector of T1 to the base of T2.

A diode D1 in series on the A1 side and a capacitor C1 in parallel apply a positive direct current polarity to terminal B1 of motor M when frequency F1 is emitted. A diode D2 in series on the A2 side and a capacitor C2 in parallel apply a direct current polarity to terminal B2 when frequency F2 is emitted.

In the first case, a positive voltage being applied by terminal B1 to the base of T2 through resistor R2, transistor T2 is saturated; its internal impedance is virtually zero; on the other hand, the collector of T2 is just about at the potential of the ground. That potential is applied through resistor R1 to the base of T1, which is hence blocked. The positive current therefore flows through motor M from B1 towards B2, this making motor M rotate in a first direction.

If, on the other hand, frequency F2 is applied to access A2, a similar reasoning shows that terminal B2 is at a positive potential, terminal B1 being at a potential close to that of the ground and motor M rotates in the direction opposite to the first direction.

Figure 3:
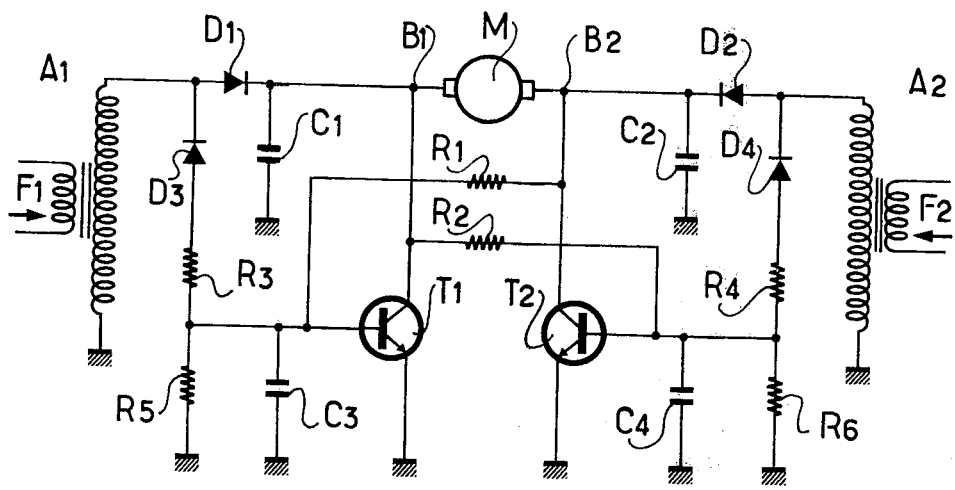
FIG. 3 is a second and more perfected diagram of the same circuit.

FIG. 3 — Herein, the same references as in FIG. 2 designate the same components, and it has, moreover, two rectifier circuits in opposite directions: D3, R3, R5, C3 on the same side as access A1, D4, R4, R6, C4 on the same side as access A2.

The result of this, in the case where the frequency F1 is applied, is a negative polarity applied to transistor T1, which is, due to this, energetically blocked, instead of approximately blocked as in the circuit according to FIG. 2. Conversely, if frequency F2 is applied to access A2, transistor T2 is energetically blocked.

The circuit according to FIG. 3 therefore ensures safety for proper operation better than the circuit according to FIG. 2.

Figure 4:
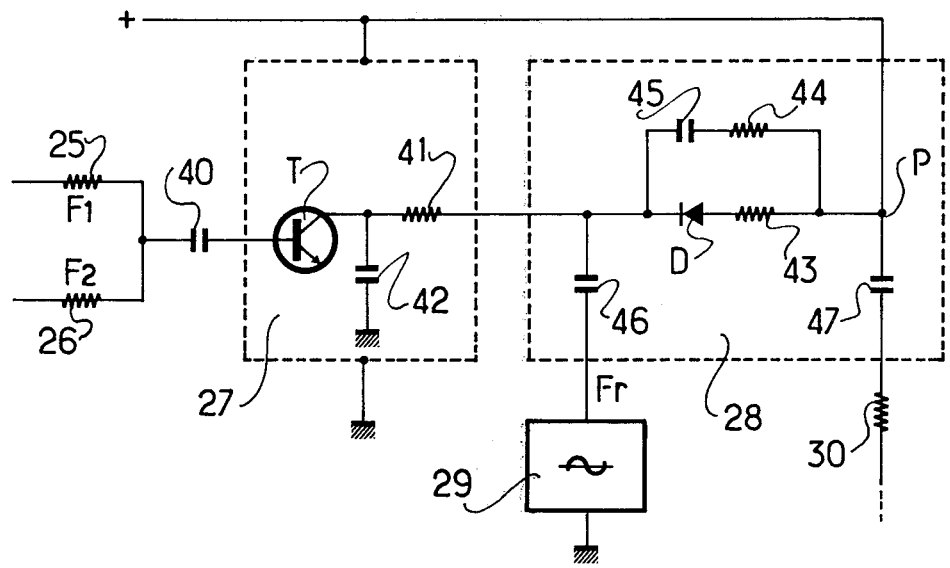
FIG. 4 is a simplified basic circuit diagram of the above-mentioned semiconductor type attenuator.

FIG. 4 — The figure shows, in a simplified form, a diagram of detector 27 and of attenuator 28 according to FIG. 1.

Rectifier 27 is constituted preferably by a transistor T fed by a positive source (+) and connected up as a detector by means of a network of resistors, not shown.

Variable attenuator 28 is constituted essentially by a diode D, crossed by the direct current of the collector of transistor T. Diode D is in series with a resistor 43, the branch circuit (D, 43) being shunted by another branch circuit formed by a resistor 44 in series with a capacitor 45.

Frequency Fr supplied by oscillator 29 is applied to the input of the network (D, 43, 44, 45) through a capacitor 46; it emerges therefrom at point P, connected to resistor 30 (see FIG. 1) by a capacitor 47.

A resistor 41 in series between the collector of transistor T and diode D, and a capacitor 42 connected to ground, prevent the return of frequency Fr through transistor T.

The current of the collector of transistor T crosses diode D: the result of this is that for a relatively high frequency level F1 or F2, diode D has a relatively low internal impedance, and vice versa. Consequently, the level of frequency Fr which is sent in resistor 30 and thence towards the terminal station, is high for a high level of frequency F1 (or F2) leaving filter 21 (or 22), and vice versa.

Resistor 43 constitutes a residual resistor when diode D is crossed by a high current; the branch circuit formed by resistor 44 and capacitor 45, constitutes a derivation when diode D is practically blocked, so as to set limits to the extreme variations of the frequency Fr sent on the line.

Figure 5:
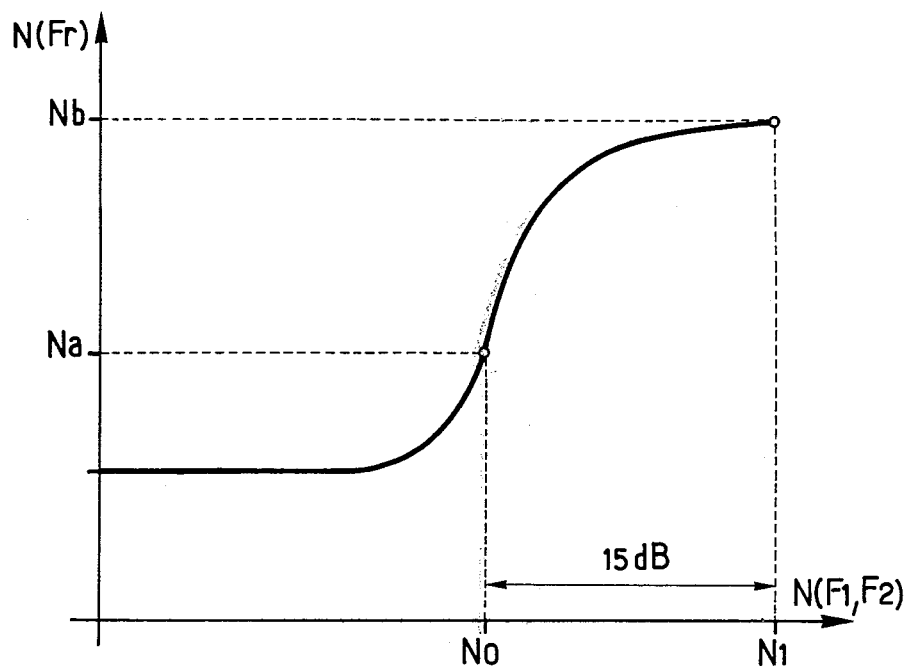
FIG. 5 is a graph showing the various operating procedures of said attenuator.

FIG. 5 — Herein is shown approximately the variations in the level of return frequency Fr received at the terminal station.

As it is not possible to re-adjust quartz filters 21 or 22 at a distance, to align them with frequency F1 or F2 respectively, the reverse process is carried out:

Before emitting required frequency (F1 or F2) at a level sufficient for making motor M rotate, it is emitted at a level of about 15 dB lower (No) to adjust its exact (frequency) value so as to observe, at the terminal station, a maximum of the level of the frequency Fr, when frequency emitted (F1 or F2) is aligned with the resonance of corresponding quartz (21 or 22).

To remote control the adjustment of an equalizer whose order is i, the following operation is carried out:
1. A frequency F1 or F2 close to rated frequency F1i (F2i) is emitted at level No and corresponding level Na of frequency Fr is observed. Frequency F1 (or F2) is adjusted so as to bring level Na to its maximum value.
2. To make motor M rotate in the required direction, frequency F1 (or F2) is emitted at the level N1, which brings frequency Fr to level Nb at the terminal station.
3. When motor M rotates, level Nb does not remain fixed; as has been set forth in the description of FIG. 1, this level reaches a maximum each time switch 12 is on a contact element. The emission of frequency F1 (or F2) is stopped when motor M has rotated by the predetermined number of contact elements.

Frequency F1 (or F2) itself, amplified and rectified, makes motor M rotate. That arrangement ensures the control at the terminal station by the observation of the level Nb of the frequency Fr, and increases, therefore, the reliability, by avoiding any unseasonable rotation of the motor in the case of a defect of one of the elements constituting the equalizer, which could set off a feeding of the motor supplied by an outside source.

Figure 6:
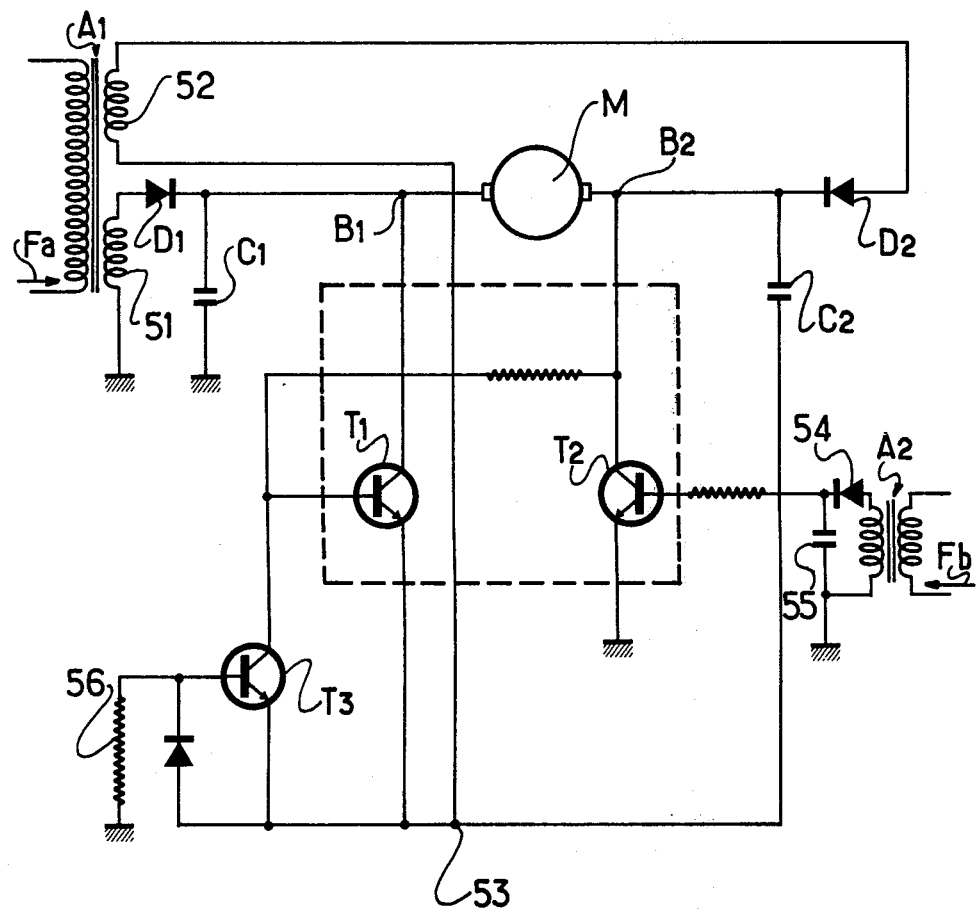
FIG. 6 is a circuit diagram for assigning one of the remote control frequencies to the supplying of the rotation energy in an equalizer and the other frequency to the control of the rotation direction.

Contrary to that first embodiment described in FIGS. 1 to 5, in which two characteristic frequencies of a particular equalizer of the line and, consequently, two quartz filters and two power amplifiers are needed, an embodiment of the invention in which a single control frequency Fa is characteristic of a particular equalizer, whereas the other control frequency Fb is common to all the equalizers of the line and defines, by its presence or absence, the rotation direction of the motor, will now be described with reference to FIG. 6.

In that embodiment, only one quartz filter and only one power amplifier are now needed for characteristic frequency Fa, frequency Fb needing only one, less selective, filter and no power amplifier. In the equalizer equipment used in that case, amplifier 24 according to FIG. 1 is dispensed with and filter 22 according to that same figure is replaced by a less selective filter.

The first access A1 therefore receives characteristic frequency Fa and thus feeds a double transformer having two secondary coils 51 and 52, the first of which is connected up between the ground and a rectifier and filtering circuit (diode D1, capacitor C1), the latter circuit being connected up to a first terminal B1 of motor M. The other terminal of motor B2 is connected up through another rectifier and filtering circuit (diode D2, capacitor C2) to one end of the other coil 52, whose other end is connected to a point 53 to which filtering capacitor C2 is connected.

As in the preceding embodiment, there are two transistors T1 and T2 which are conductive alternately and which define the rotation direction of the motor. Contrary to the preceding example, the emitter of the transistor T1 is connected to point 53 and its collector is not connected so as to control the base current of transistor T2. The latter transistor is, on the other hand, controlled by frequency Fb, which is applied through the second access A2 and a rectifier and filtering circuit (diode 54, capacitor 55) to the base of that transistor.

Another transistor T3 is connected by its collector to the base of transistor T1, by its emitter to point 53 and by its base through a resistor 56 to the ground. The operation of this diagram is as follows: in the absence of frequency Fb and in the presence of frequency Fa, transistor T2 and transistor T3 are blocked, whereas transistor T1 is saturated. The motor rotates in one direction due to a current which is set up between capacitor C2 (which is fed from coil 52), transistor T1, terminal B1, the motor and terminal B2.

When frequency Fb is present, transistor T1 becomes blocked and the two transistors T2 and T3 become conductive. In this situation, the motor rotates in the opposite direction due to a current, which, from the ground, crosses transistor T2, terminal B2, the motor, terminal B1 and capacitor C1, which is fed from coil 51. It is evident that the power necessary for frequency Fb is very much lower than the power necessary for the rotation of the motor, supplied by frequency Fa.

The invention is in no way limited to the remote adjusting of an inaccessible equalizer on a transmission line, but may be applied to any element which is liable to be positioned by rotation in one direction or the other under the control of two frequencies.

What is claimed is:

1. A device for the remote adjustment of a switchable network equipping an unattended station on a transmission line, from a terminal station on this line, comprising at the unattended station:
    a switch having several contact elements, connected to said switchable network for operating the same;
    a direct current motor having two possible rotating directions, for actuating said switch,
    a circuit having a first input for a first remote control frequency and a second input for a second remote control frequency, said frequencies being emitted from the terminal station, said circuit having two outputs connected respectively to a first and a second terminal of said motor, said circuit operating said motor according to the presence or absence of said remote control frequencies at said inputs,
    an oscillator permanently emitting a third frequency, and
    means for sending back to the terminal station said third frequency, said means including an attenuation network having two attenuation coefficients and means controlling said attenuation network and connected to said switch for enabling said attenuation network to present a first attenuation coefficient when said switch is on a contact element and a second attenuation coefficient when said switch is between two contact elements.

2. A device according to claim 1, wherein said sending back means further includes an electronically controlled attenuator controlled by a level detector connected to said first and second inputs.

3. A device according to claim 1, wherein, in said circuit operating said motor, said first input access feeds a transformer having two secondary coils one of which is connected between zero potential and a first rectifier and filtering circuit, the latter circuit being connected to one of the terminals of said motor, the other coil being connected through a second rectifier and filtering circuit to the other terminal of said motor, said second input being connected through a third rectifier and filtering circuit to an input for controlling the state of a flip-flop, which, as a function of the presence or absence of the second frequency at the second input, connects the motor in parallel with said first or said second rectifier and filtering circuit.

4. A device according to claim 1, wherein, in said circuit operating said motor, said first input is connected to said first terminal of said motor through a first rectifier and filtering circuit and said second input access is connected to said second terminal of said motor through a second rectifier and filtering circuit, said terminals being connected to two respective transistors interconnected so as to form a flip-flop such that in the case of the presence of the first frequency at the first input, the transistor connected to said second terminal receives at its base a saturation voltage and the transistor connected to said first terminal receives at its base a virtually zero voltage and vice versa.

5. A device according to claim 4, wherein said sending back means further includes an electronically controlled attenuator controlled by a level detector connected to said first and second inputs.

6. A device according to claim 5, wherein said detector comprises a transistor which delivers a direct current proportional to the level of the first or the second frequency received, said attenuator comprising a diode which is traversed by said direct current.

7. A device according to claim 6 in which said diode is in series with a first resistor and is shunted by an arm formed by a second resistor in series with a capacitor.

8. A device according to claim 1, wherein, in said circuit operating said motor, said first input is connected to said first terminal of said motor through a first rectifier and filtering circuit and said second input is connected to said second terminal of said motor through a second rectifier and filtering circuit, said terminals being connected to two respective transistors interconnected so as to form a flip-flop such that in the case of the presence of the first frequency at the first input, the transistor connected to said second terminal is saturated and the transistor connected to said first terminal is blocked, and vice versa, the blocking of the transistor connected to said first terminal being reinforced by means of a third rectifier and filtering circuit connected in parallel to said first input and supplying a voltage which is the reverse of the voltage supplied by said first circuit, and the blocking of the transistor connected to said second terminal being reinforced by means of a fourth rectifier and filtering circuit connected in parallel to said second input and supplying a voltage which is the reverse of the voltage supplied by said second circuit.

9. A device according to claim 8, wherein said sending back means further includes an electronically controlled attenuator controlled by a level detector connected to said first and second inputs.

10. A device according to claim 9, wherein said detector comprises a transistor which delivers a direct current proportional to the level of the first or the second frequency received, said attenuator comprising a diode which is traversed by said direct current.

11. A device according to claim 10, in which said diode is in series with a first resistor and is shunted by an arm formed by a second resistor in series with a capacitor.

* * * * *